May 17, 1927.
E. DUGAW
GRAIN DOOR
Filed May 17, 1926
1,628,958
3 Sheets-Sheet 1
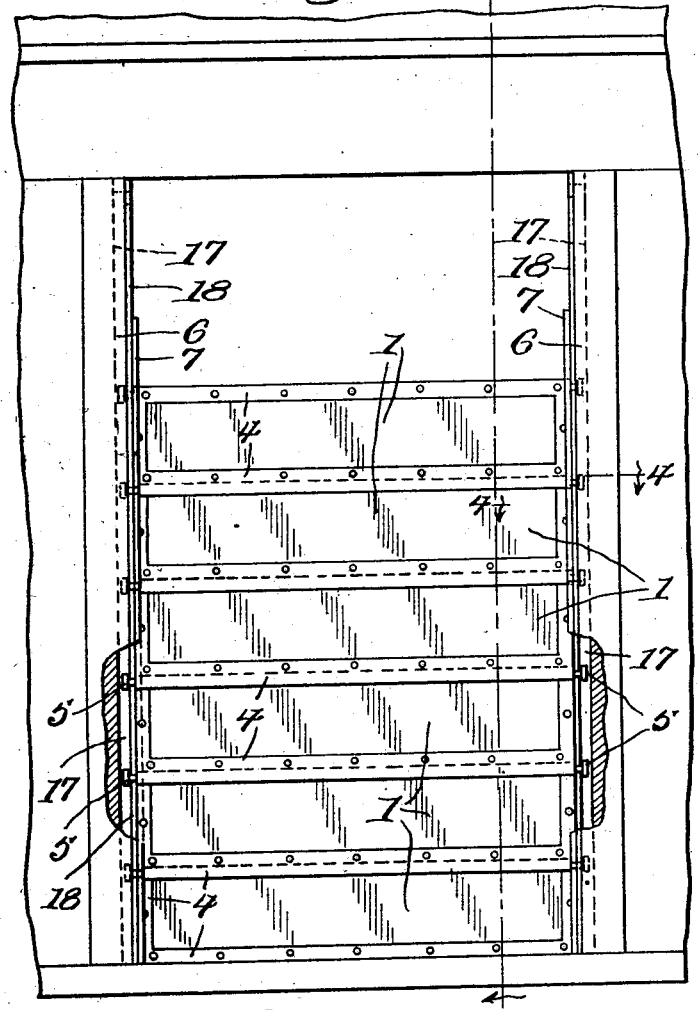
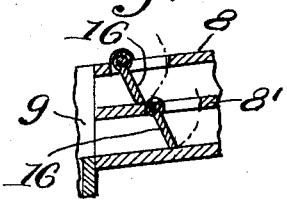
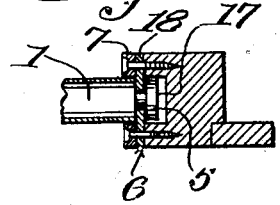
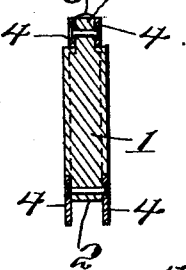
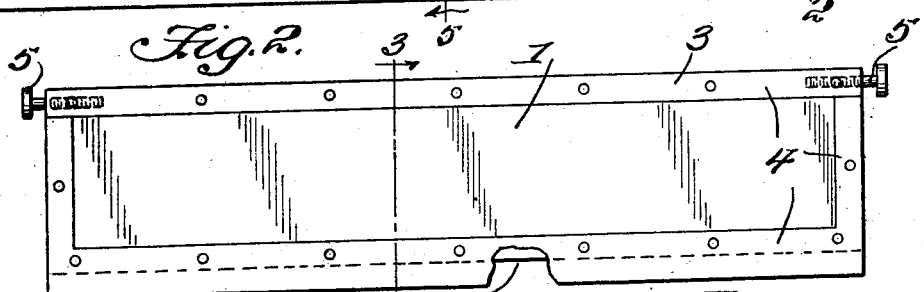
Eugene Dugaw INVENTOR
BY Victor J. Evans ATTORNEY
WITNESS: J.T.L. Wright May 17, 1927.   1,628,958
E. DUGAW
GRAIN DOOR
Filed May 17, 1926   3 Sheets-Sheet 2
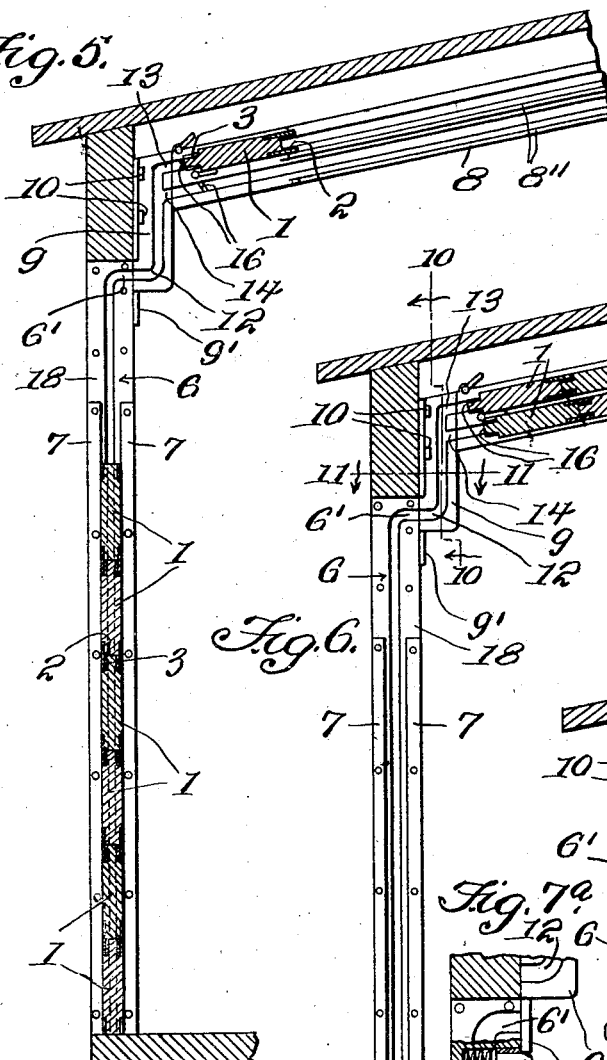
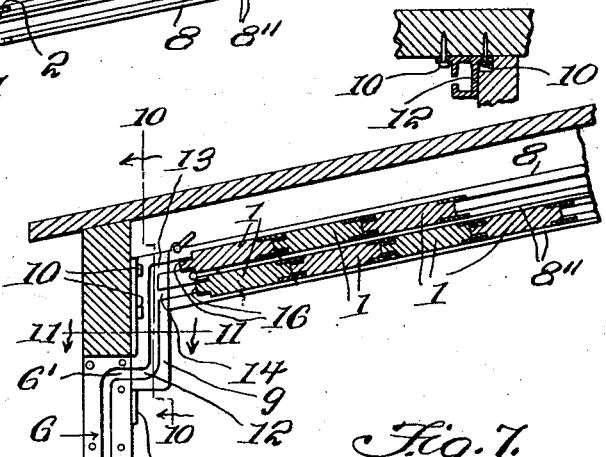
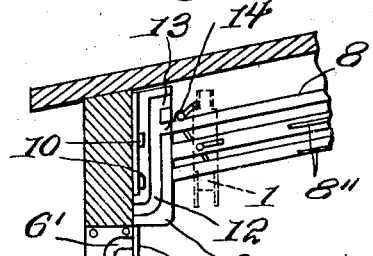
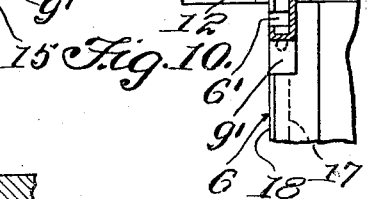
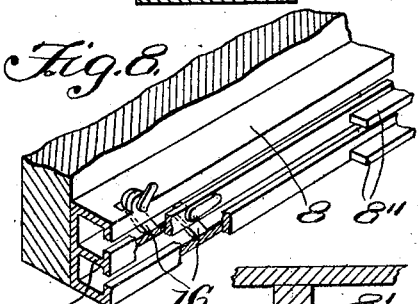
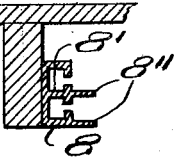
Eugene Dugaw INVENTOR
BY Victor J. Evans ATTORNEY
WITNESS: J. L. Wright May 17, 1927.

E. DUGAW

GRAIN DOOR

Filed May 17, 1926

Eugene Dugaw
INVENTOR

BY Victor J. Evans
ATTORNEY

WITNESS: J.T.L. Wright

Patented May 17, 1927.

1,628,958

UNITED STATES PATENT OFFICE.

EUGENE DUGAW, OF TACOMA, WASHINGTON.

GRAIN DOOR.

Application filed May 17, 1926. Serial No. 109,700.

This invention relates to improvements in grain doors for freight cars, the general object of the invention being to provide a grain-tight door formed in sections and provided with track means whereby the sections can be placed in the top of the car, when not in use so that they will be out of the way when the car is used for other purposes.

Another object of the invention is to provide latch means for holding the sections in the top of the car, such means working automatically to permit the sections to pass on to the track parts in the top of the car and being raised by hand to permit the sections to be lowered to close the door.

A further object of the invention is to make portions of the track means adjustable so that they can be moved above the door opening, when the grain door is not in use, so as to prevent timber and the like, being loaded on the car, from injuring such portions. These movable portions also provide means for enabling the door sections to be removed from the track parts.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary view of a car showing the grain door in closed position, parts being broken away.

Figure 2 is a view of one of the door sections.

Figure 3 is a section on line 3—3 of Figure 2.

Figure 4 is a section on line 4—4 of Figure 1.

Figure 5 is a section on line 5—5 of Figure 1.

Figure 6 is a similar view, but showing the door sections in raised position.

Figure 7 is a sectional view through the upper portion of a car showing a track part in raised position.

Figure 7a is a detail view showing the means for holding the track part in raised position.

Figure 8 is a perspective view of portion of the track part in the top of the car.

Figure 9 is a transverse sectional view through this portion of the track part.

Figure 10 is a section on line 10—10 of Figure 6.

Figure 11 is a section on line 11—11 of Figure 6.

Figure 12 is a sectional detail view showing the latch means.

Figure 13:
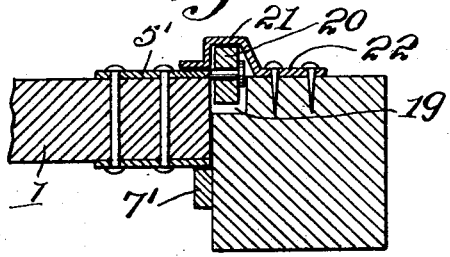
Figures 13 to 20 are sectional detail views showing different forms of track parts for the door sections.

In these views, 1 indicates a plurality of door sections, each of which has a socket 2 formed in its bottom edge and a reduced part 3 at its upper edge, the reduced part of one section fitting in the socket of the other section so as to make a grain-tight joint between the sections. As shown, I prefer to bind the edges of each section with metal strips 4 to prevent wear, the lower strips forming the socket 2 and the upper strips covering the sides of the reduced portion. A headed projection 5 is located at each end of each section adjacent the upper edge of the section. A track or guideway 6 is formed in each side edge of the door opening to receive the projections so that the sections can be moved vertically in the door opening and they can also be swung about their horizontal axes. This swinging action, however, is prevented while the sections are in the major portion of the door opening by means of the strips 7 placed on each side of each track and receiving the end edges of the sections between them, as shown in Figure 4. Thus the sections cannot be swung until they reach the top part of the door opening. A double track 8 is arranged in the top of the car for holding the sections in the top of the car when they are not in use and the double track parts are connected with the tracks 6 by the track members 9 which are slidably connected with that portion of the car above the door opening through means of the bolts 10 engaging the slots 11.

Each member 9 has an L-shaped groove 12 therein, the upper part of which is formed of two branches 13 and 14 which extend through the edge of the member. When each member is in lowered position, the horizontal portion of the groove will register with a horizontal part 6' of the track 6, while the branches 13 and 14 will register with the double track 8 so that the sections can be pushed up the tracks 6 through the horizontal parts 6' into the grooves 12 of the members 9 and then pass from said grooves 12 into either of the track parts of the double track 8 through the branches 13 and 14. By having these double tracks in the top of the car, some of the sections can be placed in the upper track parts and others in the lower track parts, as shown in Figure 6, so that all the sections can be accommodated in the top of the car. By moving the members 9 upwardly, the grooves 12 therein will be moved out of register with the double tracks 8 and the tracks 6 so that the sections can be entirely removed from the car by moving them from the double track parts through the branches 13 of the members 9. When the members 9 are in raised position, extensions 9' thereon will come opposite the horizontal parts 6' of the tracks 6 and thus close these parts and said members 9 are held in raised position by spring plungers 15 which will automatically engage the ends of the extensions 9' to hold the members 9 in raised position. When the members are to be lowered, the plungers must be pushed inwardly by hand. By raising these sections or members 9, they will be out of the way of timber or the like being loaded into the car.

The sections are held in the double tracks by means of the gravity gates or latches 16 which are pivotally arranged in the track parts and normally close these parts under the action of gravity. These members 16 are so arranged that they will be swung upwardly by the projections on the sections as the sections enter the double track parts, but they will prevent the sections from being lowered again until the members 16 are swung upwardly by hand.

Figure 4 shows the track 6 as composed of a groove 17 formed in each side portion of the door opening and a slotted plate 18 covering the groove, the stem of each projection 5 engaging the slot in the plate 18, with the head of the projection engaging the groove 17. The strips 7 engage the outer portions of the plate 18. The double tracks 8 are formed of channel members which have inwardly turned flanges, with a T-shaped partition 8' which divides the channel member into the two track parts. The lower flange and the partition are each formed with extensions 8'' which engage the end edges of the sections and prevent them from swinging downwardly into vertical position, these extensions forming guideways for the ends of the sections and holding them parallel with the car roof. Each member 9 has a part of channel shape to provide the groove 6 for engaging the projections on the sections, as shown in Figure 11.

Figure 13 shows a modified form of track in each side of the door opening. In this form, the groove 19 is formed in the corner of the door frame and a roller 20 is fastened to the projection 5' placed on the outer edge of a door section, the groove 19 forming a portion of the track for the roller, the other portion being formed by an offset part 21 of a strip 22 fastened to the frame. An extension on the strip 22 forms, with the single strip 7', a guideway for the section to prevent swinging movement of the same.

Figure 14:
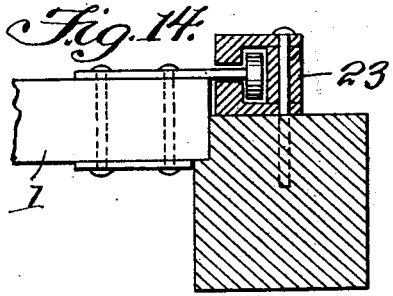

Figure 14 shows the entire track 23 placed on the outer face of the door frame.

Figure 15:
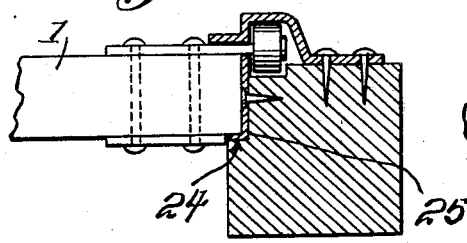

Figure 15 shows a modification somewhat similar to that shown in Figure 13, but showing the end of the section as engaging a guideway 24 formed in each side of the door opening, this guideway being lined by a plate 25.

Figure 16:
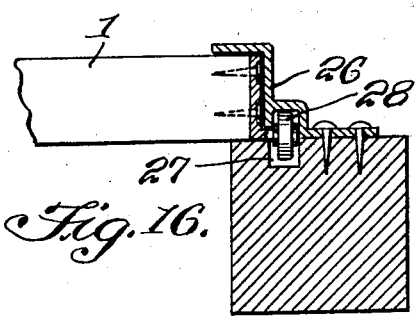

Figure 16 shows a plate 26 shaped to form the guideway for the ends of the sections and also cooperating with a groove 27 in the outer face of the door post for forming a track for the roller 28 attached to a projection on a section. In this form of the invention, the door sections are arranged outside of the doorway instead of between the door posts.

Figure 17:
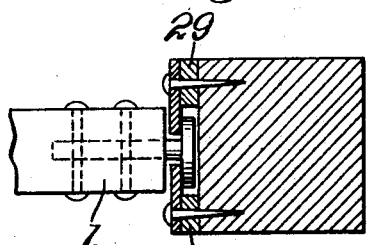

Figure 17 shows a modification somewhat similar to the first form but showing the groove for the head of each projection formed by the plates 29 instead of engaging grooves formed in the door post.

Figure 18:
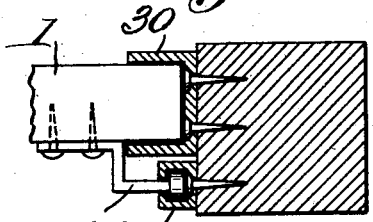

Figure 18 shows the guideways for the ends of the sections formed by a channel member 30 attached to the inner face of each door post and a similar channel member 31 attached to the inner face of the door post for receiving the projections 32 of the door sections.

Figure 19:
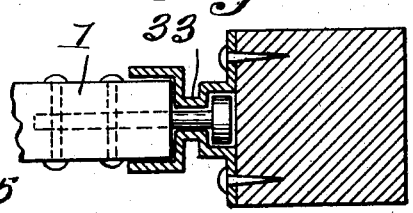

Figure 19 shows the guideways for the ends of the sections and the tracks for the projections formed by the plates 33 which are attached to the inner faces of the door posts.

Figure 20:
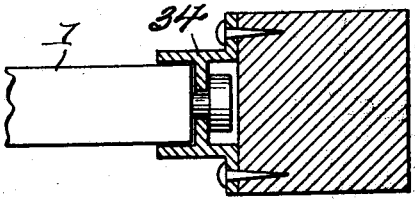

Figure 20 shows a similar arrangement as that shown in Figure 19, except the plates 34 are of slightly different shape.

From the foregoing, it will be seen that I have provided simple means for making a grain-tight closure for a freight car, with means whereby the door sections can be moved to the top of the car where they will be out of the way, when not in use, so that the car can be used for other purposes than hauling grain. The sections are held against swinging movement while in closing position but can be swung outwardly or inwardly when they are moved to the upper portion of the door opening so that they can be easily passed into the track parts of the members 9 and passed into the double tracks at the top of the car. The sections can be entirely removed when necessary by raising the members 9, and said members can be raised so that they will be out of the way when the car is being used for hauling material other than grain.

The drawings also show various ways of forming the tracks and the guideways.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a car and its doorway, a grain door comprising a plurality of sections, each section having a socket in its lower edge and a reduced upper edge, the reduced edge of one section fitting in the socket of the other section, a projection at each end of each section, a track at each side of the doorway engaged by the projections, guideways at the sides of the doorway terminating short of the upper end of the doorway for receiving the ends of the sections, double tracks at the top of the car for receiving the sections, latches for holding the sections in the double track parts and a track section for connecting the track in each side of the doorway with each double track part.

2. In combination with a car and its doorway a grain door comprising a plurality of sections, each section having a socket in its lower edge and a reduced upper edge, the reduced edge of one section fitting in the socket of the other section, a projection at each end of each section, a track at each side of the doorway engaged by the projections, guideways at the sides of the doorway terminating short of the upper end of the doorway for receiving the ends of the sections, double tracks at the top of the car for receiving the sections, latches for holding the sections in the double track parts, a track section for connecting the track in each side of the doorway with each double track part, each track section having a track of L-shape therein with two branches at its upper end for registering with the double tracks, each track of the doorway having a horizontal upper part for registering with the horizontal part of each track section.

3. In combination with a car and its doorway, a grain door comprising a plurality of sections, each section having a socket in its lower edge and a reduced upper edge, the reduced edge of one section fitting in the socket of the other section, a projection at each end of each section, a track at each side of the doorway engaged by the projections, guideways at the sides of the doorway terminating short of the upper end of the doorway for receiving the ends of the sections, double tracks at the top of the car for receiving the sections, latches for holding the sections in the double track parts, a track section for connecting the track in each side of the doorway with each double track part, each track section having a track of L-shape therein with two branches at its upper end for registering with the double tracks, each track of the doorway having a horizontal upper part for registering with the horizontal part of each track section, each track section being vertically movable and means for holding the section in raised position.

4. In combination with a car and its doorway, a grain door comprising a plurality of sections, each section having a socket in its lower edge and a reduced upper edge, the reduced edge of one section fitting in the socket of the other section, a projection at each end of each section, a track at each side of the doorway engaged by the projections, guideways at the sides of the doorway terminating short of the upper end of the doorway for receiving the ends of the sections, double tracks at the top of the car for receiving the sections, latches for holding the sections in the double track parts, a track section for connecting the track in each side of the doorway with each double track part, each track section having a track of L-shape therein with two branches at its upper end for registering with the double tracks, each track of the doorway having a horizontal upper part for registering with the horizontal part of each track section, each track section being vertically movable and means for holding the section in raised position, such means consisting of a spring plunger for engaging the lower part of each track section.

5. In combination with a car and its doorway, a grain door comprising a plurality of sections, each section having a socket in its lower edge and a reduced upper edge, the reduced edge of one section fitting in the socket of the other section, a projection at each end of each section, a track at each side of the doorway engaged by the projections, guideways at the sides of the doorway terminating short of the upper end of the doorway for receiving the ends of the sections, double tracks at the top of the car for receiving the sections, latches for holding the sections in the double track parts, a track section for connecting the track in each side of the doorway with each double track part, each track section having a track of L-shape therein with two branches at its upper end for registering with the double tracks, each track of the doorway having a horizontal upper part for registering with the horizontal part of each track section, each track section being vertically movable, means for holding the section in raised position, each track section having a depending part for closing the upper end of each track of the doorway when the track section is in raised position.

In testimony whereof I affix my signature.

EUGENE DUGAW.